United States Patent Office 2,910,472
Patented Oct. 27, 1959

2,910,472

PROCESS FOR PRODUCING CERTAIN SUBSTITUTED BENZOXAZOLES

Adolf Emil Siegrist, Basel, and Franz Ackermann, Binningen, Switzerland, assignors to Ciba Limited, Basel, Switzerland, a firm of Switzerland No Drawing. Application May 13, 1958
Serial No. 734,848

4 Claims. (Cl. 260—240)

This is a continuation in part of our application Ser. No. 591,275, filed June 14, 1956 (abandoned since the filing of the present application).

This invention provides new oxazole compounds which like, for example, the compound of the formula (1)

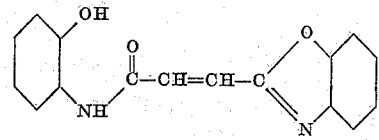

correspond to the general formula (2)

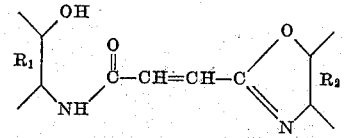

in which $R_1$ and $R_2$ each represents an aryl radical, $R_1$ being bound to the —OH group and —NH— group and $R_2$ being fused on to the oxazole ring in the manner indicated in the formula.

The invention also provides a process for the manufacture of the compounds of the above Formula 2, wherein two molecular proportions of an ortho-hydroxy-aminoaryl compound are condensed with 1 molecular proportion of thiomalic acid or a functional derivative thereof.

The ortho-hydroxy-aminoaryl compounds used as starting materials may be, for example, of the naphthalene series or advantageously of the benzene series, and there are advantageously used monocyclic ortho-hydroxy-aminoaryl compounds of the benzene series. The starting materials may contain, in addition to the ortho-hydroxy-aminoaryl grouping, further substituents, for example, lower alkyl or alkoxy groups, such as ethyl, methyl, ethoxy or methoxy groups, or halogen atoms such as chlorine, or nitro groups. As examples of ortho-hydroxy-aminoaryl compounds there may be mentioned:

1-amino-2-hydroxynaphthalene,
1-amino-2-hydroxybenzene,
1-amino-2-hydroxy-5-methylbenzene,
1-amino-2-hydroxy-4-methylbenzene,
1-amino-2-hydroxy-5-methoxybenzene,
1-amino-2-hydroxy-3:5-dimethylbenzene,
1-amino-2-hydroxy-5-tertiary butylbenzene,
1-amino-2-hydroxy-4- or -5-nitrobenzene,
1-amino-2-hydroxy-5-chlorobenzene and
1-amino-2-hydroxy-3:5-dichlorobenzene.

The other starting materials used in the present process are thiomalic acid and functional derivatives thereof, for example, monoesters or diesters thereof. Among the esters of the aforesaid dicarboxylic acid there may be used, more especially, those having radicals of alkanols of low molecular weight, for example, the dimethyl ester or diethyl ester.

The ortho-hydroxy-aminoaryl compounds are condensed with the thiomalic acid or functional derivative thereof in the molecular ratio 2:1. The starting materials are therefore brought together for the reaction approximately in this ratio, and it is preferable to use a small excess of the thiomalic acid or derivative thereof rather than an excess of the aminoaryl compound. In this manner the formation of undesired by-products and loss of the starting materials are to a very great extent avoided.

The condensation is advantageously carried out at a raised temperature, and preferably in an inert organic solvent. As solvents there are used principally high boiling solvents, for example, substitution products of benzene, such as monochlorobenzene, dichlorobenzenes, trichlorobenzenes or nitrobenzenes, or especially high boiling hydrocarbons of the benzene series, such as toluene, xylene or cumene. The reaction temperature is advantageously within the range of 100–200° C. It is of advantage to work at the boil in one of the aforesaid solvents. Hydrogen sulfide is formed and escapes during the reaction, and water likewise formed may be separated from the distilled solvent with the aid of a water separator and the solvent returned to the reaction mixture.

Although the precise mechanism of the reaction is not known, it is quite clear from analyses of the end products and the formation of water and hydrogen sulfide that 2 molecules of the aminoaryl compound combine with 1 molecule of thiomalic acid accompanied by the splitting off of 3 molecules of water and 1 molecule of hydrogen sulfide with formation of one oxazole ring.

The oxazole compounds of the Formula 2 are valuable intermediate products which can be used, for example, for the manufacture of dyestuffs or optical brightening agents. For example, they can be converted by means of agents capable of splitting off water into di-(aryloxazolyl)-ethylenes, which are obtained in this manner much more easily and in a purer state than by the known methods of heating hydroxy-aminoaryl compounds with succinic acid, and then dehydrogenating, or by melting oxy-compounds with fumaric acid or maleic acid.

The following examples illustrate the invention, the parts and percentages being by weight unless otherwise stated, and the relationship of parts by weight to parts by volume being the same as that of the kilogram to the liter:

Example 1

66.5 parts of 1-amino-2-hydroxy-5-methylbenzene are stirred with 700 parts of chlorobenzene with the exclusion of air. There are then added 37.5 parts of d:l-thiomalic acid, the mixture is heated in the course of about 30 minutes to 130° C., then stirred for 12 hours at 130–132° C. while distilling off and removing the water formed by the reaction and the hydrogen sulfide. The chlorobenzene is then distilled off with steam. After cooling the reaction mixture, it is filtered and the filter residue is recrystallized from aqueous alcohol. There is obtained a pale crystalline powder melting at 200–201° C., which corresponds to the formula

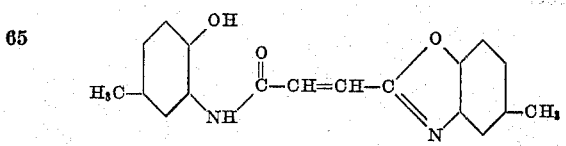

*Analysis.*—$C_{18}H_{16}O_3N_2$ calculated: C=70.11, H=5.23, N=9.09. Found: C=69.95, H=5.39, N=8.99.

By melting the latter product with zinc chloride at 160–168° C. for 6 hours there is obtained α:β-di-[5-methylbenzoxazolyl-(2)]-ethylene of the formula

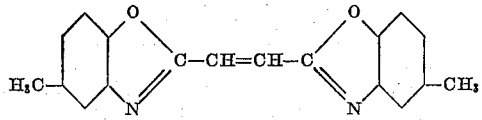

which melts at 183–184° C. after recrystallization from a mixture of methylene chloride and methanol.

By using, instead of 66.5 parts of 1-amino-2-hydroxy-5-methylbenzene, a molecularly equivalent quantity of 1-amino-2-hydroxybenzene there is obtained the compound of the formula

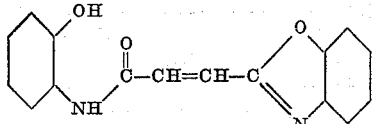

which melts at 189–190° C. after recrystallization from a mixture of alcohol and water.

*Analysis.*—$C_{16}H_{12}O_3N_2$ calculated: C=68.56, H=4.32, N=10.00. Found: C=68.91, H=4.52, N=9.89.

By melting the latter compound with zinc chloride there is obtained α:β-di-[benzoxazoyl-(2)]-ethylene of the formula

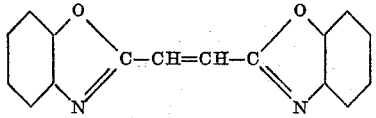

melting at 242–243° C. after recrystallization from dioxane.

Example 2

71.8 parts of 1-amino-2-hydroxy-5-chlorobenzene are heated in the absence of air with 37.5 parts of d:l-thiomalic acid in 600 parts by volume of xylene, while stirring, for 12–24 hours under reflux, the water formed being continuously distilled off and the hydrogen sulfide formed being removed. When water ceases to be split off, the mixture is cooled, filtered, and the filter residue is washed with xylene and dried. By recrystallization from a mixture of alcohol and water the almost colorless crystalline condensation product of the formula

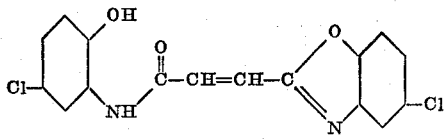

is obtained melting at 192–194° C.

*Analysis.*—$C_{16}H_{10}O_3N_2Cl_2$ calculated: C=55.03, H=2.89, N=8.02, Cl=20.31. Found: C=54.96, H=3.03, N=8.11, Cl=20.06.

By melting the latter product with zinc chloride there is obtained α:β-di-[5-chlorobenzoxazolyl-(2)]-ethylene of the formula

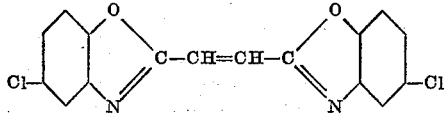

which melts at 262–263° C. after recrystallization from dioxane.

Example 3

If the procedure of Example 1 is followed and instead of 1-amino-2-hydroxy-5-methylbenzene there is used 1-amino-2-hydroxy-4-methylbenzene as starting material the compound of the formula

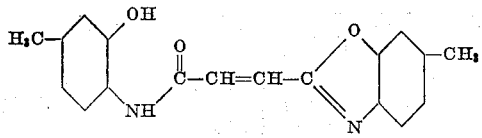

is obtained. By melting the latter with zinc chloride at 160–180° C. for several hours there is obtained α:β-di-[6-methyl-benzoxazolyl-(2)]ethylene of the formula

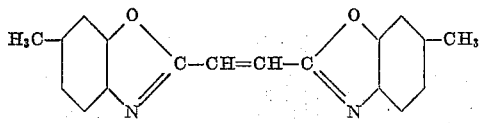

which after recrystallization from a mixture of methylene chloride and methanol, melts at 190–191° C.

What is claimed is:

1. Process for the manufacture of an oxazole compound, which comprises condensing in an organic solvent at a temperature between 100 and 200° C. two molecular proportions of a compound of the formula

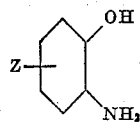

in which Z represents a member selected from the group consisting of a hydrogen atom, a methyl group and a chlorine atom, with one molecular proportion of thiomalic acid.

2. Process for the manufacture of an oxazole compound which comprises condensing in an organic solvent at a temperature between 100 and 200° C. two molecular proportions of 1-amino-2-hydroxybenzene with one molecular proportion of thiomalic acid.

3. Process for the manufacture of an oxazole compound which comprises condensing in an organic solvent at a temperature between 100 and 200° C. two molecular proportions of 1-amino-2-hydroxy-5-methylbenzene with one molecular proportion of thiomalic acid.

4. Process for the manufacture of an oxazole compound which comprises condensing in an organic solvent at a temperature between 100 and 200° C. two molecular proportions of 1-amino-2-hydroxy-5-chlorobenzene with one molecular proportion of thiomalic acid.

References Cited in the file of this patent

UNITED STATES PATENTS

| | | |
|---|---|---|
| 2,323,503 | Wilson | July 6, 1943 |
| 2,483,392 | Meyer et al. | Oct. 4, 1949 |
| 2,488,094 | Graenacher et al. | Nov. 15, 1949 |
| 2,807,622 | Holbro et al. | Sept. 24, 1957 |
| 2,828,317 | Siegrist et al. | Mar. 25, 1958 |

OTHER REFERENCES

Medinger: J. Prakt. Chemie (2), vol. 86, pp. 345–359 (1912).